Sept. 27, 1949.  E. G. BOICE  2,482,962
TOOL JOINT WEAR COLLAR
Filed Feb. 8, 1946
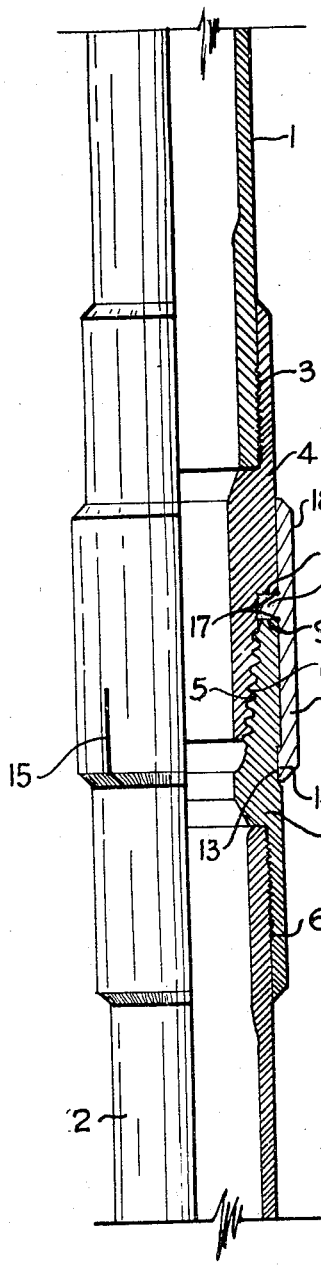
Fig 1
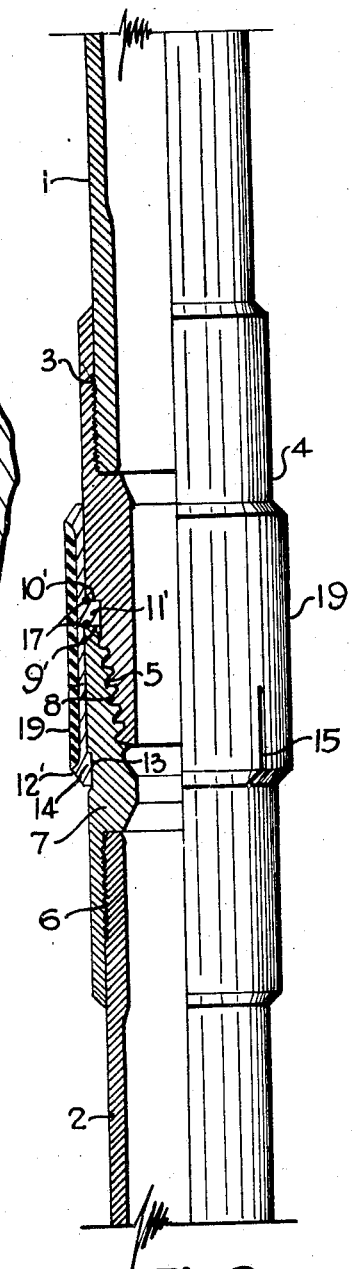
Fig 2
Fig 3
ELVIN G. BOICE
INVENTOR.
BY
ATTORNEYS Patented Sept. 27, 1949

2,482,962

UNITED STATES PATENT OFFICE 2,482,962

TOOL JOINT WEAR COLLAR

Elvin G. Boice, Houston, Tex., assignor to Reed Roller Bit Company, Houston, Tex., a corporation of Texas Application February 8, 1946, Serial No. 646,459

9 Claims. (Cl. 285—146)

1

This invention relates to tool joints and refers more particularly to interchangeable wear collars or sleeves for tool joints which may be readily shifted from one position to another in a drill stem.

Wear sleeves for tool joints have been used heretofore and in some instances were adapted to be assembled in one position within a drill stem and transferred or shifted to another drill stem position. However, in the conventional sleeves of this type, no provision has been made to resist accidental displacement of the wear sleeve from the coupling member with which it is associated when the joint is dismantled. For this reason, when the drill stem is withdrawn from the well bore, the sleeves, if left in association with one of the couplings as the stem is dismantled, are subject to accidental displacement therefrom. Obviously displacement of the wear sleeve from the stacked stem sections might result in bodily injury or property damage. In addition, when the wear sleeves are loosely associated with one of the coupling members of a dismantled tool joint, the assembly of the joint might in some instances prove troublesome. Also, in the tool joints used heretofore, either with or without a wear sleeve, there has been no provision of resilient packing means in the coupling connection, for if grooves are formed in the coupling members these grooves weaken the structure and if the flat sealing surfaces customarily employed are coated or carry resilient sealing material then the tapered joint cannot be properly tightened or secured.

An object of this invention is to provide a wear sleeve for protection of a tool joint which may be readily shifted from one position in a drill stem to another but which is not likely to be accidentally displaced from the coupling member with which it is associated when the tool joint is dismantled.

Another object is to provide an interchangeable wear sleeve with means to resist accidental displacement from a dismantled tool joint coupling member.

A further object is to provide an interchangeable wear sleeve having a spring catch or trip engageable in a groove in one of the coupling members of a tool joint whereby the sleeve is removably secured to the grooved coupling member.

Yet another object is to provide a tool joint employing resilient sealing material in the connection.

2

Other and further objects will appear from the following description.

In order to facilitate an understanding of the present invention reference is made to the accompanying drawing, in which:

Fig. 1 is a fragmentary elevational view partly in section of a well tool having a wear resisting sleeve surrounding a joint in accordance with the present invention.

Fig. 2 is a view similar to that of Fig. 1 showing a wear sleeve having a modified wear resisting surface.

Fig. 3 is an enlarged detailed sectional view of a portion of the structure shown in Fig. 1.

Referring to the drawing, the tool comprises upper and lower tubular sections 1 and 2. Section 1 is externally threaded and has screwed thereon, an internally threaded portion 3 of a male coupling member 4. This coupling member has its other end provided with an external tapered or pipe thread 5. Lower section 2 is externally threaded to receive the internally threaded portion 6 of a female coupling member 7. The other end of the coupling member 7 has a tapered socket provided with an internally tapered or pipe thread 8 and adapted to receive and thereby be coupled to the externally threaded portion of coupling member 4.

It will be noted that the threads on the ends of the tubes 1 and 2 are much finer than the tapered or pipe threads 5 and 8. This enables threads 5 and 8 to be unthreaded without loosening of the threaded connections between the coupling members and the tubes 1 and 2.

The tapered or pipe threaded ends of the coupling members 4 and 7 are so constructed that when a tight connection is formed between them the extreme end face 9 of the member 7 will be spaced from the shoulder 10 of the member 4. This provides axially spaced abutments between which lie the inwardly extending flange 11 of a wear sleeve or collar 12.

Coupling member 7 has a circumferential groove 13 in the exterior surface thereof which is adapted to receive an inturned flange 14 on the lower end of the sleeve 12. To enable the flange 14 to be received or to be placed in the groove 13 the lower end of the sleeve 12 is provided with an axially extending slot 15. By providing the slot 15 the lower end of the sleeve 12 may expand and thereby be fitted over the exterior surface of the coupling member 7 and be axially displaced until the flange 14 enters the groove 13.

As illustrated more clearly in Fig. 3 of the drawings, circumferential recesses 16 are provided within the inner face of the sleeve 12 above and below the inwardly extending flange 11. These recesses are filled with rings 17 of rubber or other sealing material which serve to provide a seal between the abutments formed on the coupling members and the sleeve 12. Thus a sealed connection is accomplished without weakening the tool joint.

Groove 13 and flange 14 serve to retain the sleeve 12 on the coupling member 7 before making a joint and after breaking the same. The upper edges of flange 14 and groove 13 are preferably slightly beveled to facilitate removal of the sleeve.

It will be noted that the sleeve surrounds portions of both coupling members but is connected by groove 13 and flange 14 with only one coupling member. While the sleeve is connected with the lower coupling member it may of course be connected instead with the upper coupling member.

The present invention contemplates the hardening of the surface of the wear sleeve or collar 12 such as by heat treating or coating with other materials. In the form of invention shown in Fig. 1 the surface of the sleeve 12 is provided with a coating 18 of tungsten carbide. When coated with tungsten carbide the wear sleeve 12 is especially adapted for work below the end of the casing where the sleeve will be subject to engagement with the surrounding formation but is not ordinarily used on joints used within the casing because of possible damage to the casing.

It is also within the contemplation of the present invention to coat the surface of the wear sleeve with material such as rubber. Fig. 2 of the drawings illustrates a joint in which the wear sleeve is coated with rubber. Most of the parts of Fig. 2 are identical to those of Fig. 1. Identical and similar parts have been indicated by the same reference characters primed. As shown in Fig. 2 of the drawings the wear sleeve has a recess formed in its outer surface in which is positioned a surrounding body of rubber 19 which may be molded and vulcanized in place, the rubber being thoroughly bonded to the metal surface of the sleeve 12'. This type sleeve is preferred for use on joints operating within the casing.

In all forms of the invention the external diameter of the wear sleeve or collar is greater than that of the coupling member and tubes thus insuring that the wear sleeves will be subjected to the greatest degree of contact with the surrounding casing or formation.

In operation the drill stem is assembled in more or less conventional manner, an additional length or section of pipe being added when permitted by the depth of the well bore. As each pipe section is added to the drill stem the tool joint of this invention is employed. The wear sleeve 12 is placed over the box 7 of the joint and forced to the position in which a flange 11 of the sleeve rests on the face 9 of the box. When in this position the flange 14 engages the groove 13. The slots 15 in the sleeve provide a spring which allows flange 14 to slide over the outer periphery of the box 7 until the flange resides in groove 13. This catch serves to removably secure the sleeve on the box. While the sleeve may be removed from the box with ordinary drill rig tools, nevertheless there is little likelihood of the sleeve becoming accidentally displaced from the coupling member when the tool joint is dismantled. It will be noted that the groove 13 is positioned at the heaviest or thickest portion of the box and thus does not weaken the joint.

When the joint is assembled the packing or seal means 17 carried by flange 11 is placed under compression and effects a positive seal for the tool joint. While the outer edges of faces 9 and 10 preferably are slightly grooved to receive the packing material 17, this slight groove is located at points on the coupling members which in operation are subjected to a minimum stress or strain and for this reason the joint is not weakened. Also, the faces 9 and 10 abut the flange 11 over sufficient surface to permit a tight secure connection between the box and pin.

As the drilling progresses the operator is careful to shift the wear sleeves into various positions throughout the drill stem so that the sleeves protecting the joints which will operate beneath the lower extremity of the casing will have a hard outer surface such as that shown in Fig. 1. On the other hand the joints operating within the well casing are preferably protected by wear sleeves as shown in Fig. 2.

It is contemplated that standard or conventional coupling members may be modified for use in accordance with this invention. This modification is accomplished by slightly reducing the outer diameter of the portion of the box 7 so that the wear sleeve can be inserted thereon. Also, it is necessary to cut off the end of the box member an amount equivalent to the thickness of the flange 11 of the wear sleeve. These modifications are simple and may be readily made. However, it is contemplated that the box member may be manufactured directly so that it is adaptable for use in accordance with this invention. It is to be noted that in modifying the box the tapered threads of the member are not in any way disturbed and the full thread length remains intact.

It will be seen that the objects of this invention have been accomplished. There has been provided a wear sleeve or collar for protecting tool joints which, in operation, may be readily transferred from one joint to another throughout the drill stem and which may be positively and removably associated with one of the coupling members of the joint. The arrangement is such as to provide a tool joint which employs a resilient sealing material and at the same time may be tightly secured together. The construction is such that standard box and pin coupling members may be easily modified so as to be useable in accordance with this invention.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. A tool joint comprising cooperating coupling members adapted to be directly connected to each other, a wear sleeve partially encasing at least one of said coupling members and having an external circumference greater than that of said coupling members, one of said coupling members having a circumferential shoulder on its external surface, one end of the sleeve being axially slotted and means integral with the slotted end of the sleeve adapted to engage said shoulder to releaseably secure said sleeve to the coupling member having the shoulder, said wear sleeve being completely unattached to the second coupling member.

2. A tool joint comprising cooperating coupling members adapted to be threadedly connected to each other, a wear sleeve partially encasing at least one of said coupling members and having an external circumference greater than that of said coupling members, one of said coupling members having a circumferential groove in its external surface, one end of said sleeve being axially slotted, and means integral with the slotted end of the sleeve and extending into said groove for locking engagement therewith, said wear sleeve being unattached to the second coupling member.

3. A tool joint comprising cooperating coupling members adapted to be directly connected to each other, a wear sleeve partially encasing at least one of said coupling members and having an external circumference greater than that of said coupling members, and resilient sealing material interposed between said sleeve and both of said connected coupling members.

4. A tool joint comprising cooperating coupling members, a wear sleeve partially encasing at least one of said coupling members and having an external circumference greater than that of said coupling members, said coupling members having axially spaced abutments, said sleeve having portions engageable with said abutments for gripping the sleeve portions between the same, and resilient sealing material interposed between said sleeve and said coupling members.

5. A tool joint comprising cooperating coupling members, a wear sleeve partially encasing at least one of said coupling members and having an external circumference greater than that of said coupling members, said coupling members having axially spaced abutments, said sleeve having an inwardly extending flange intermediate its ends and positioned to be gripped by said abutments, and resilient sealing material carried by said sleeve on each side of said flange and engaging the coupling members.

6. An interchangeable wear sleeve adaptable for use in conjunction with tool joints including cooperable coupling members having opposed shoulders, said sleeve comprising a cylindrical portion, an inturned flange carried by said cylindrical portion and adapted to be gripped between the shoulders of the coupling members in the assembled joint and resilient sealing material embedded in the sleeve on each side of the flange and adapted to sealingly engage said shoulders in use.

7. An interchangeable wear sleeve adaptable for use in conjunction with tool joints including cooperable coupling members, one of which has an outer peripheral groove, the coupling members having opposed shoulders, said sleeve comprising a cylindrical portion, an inturned flange carried by the cylindrical portion and adapted to be gripped between the shoulders of the coupling members in the assembled joint, and resilient sealing material carried by the sleeve on both sides of the flange for and adapted to sealingly engage said shoulders in use, and slots in the lower portion of the sleeve and another inturned flange carried by the slotted portion of the sleeve adaptable to fit into the coupling member groove.

8. An interchangeable wear sleeve adaptable for use in conjunction with tool joints including cooperable coupling members adapted to be connected to each other and one of which is grooved, one of the coupling members having an external shoulder which is spaced from the end of the other coupling member when the members are in connected position, said sleeve comprising a cylindrical portion, an inturned flange carried by the cylindrical portion and adapted to be gripped between the shoulder of one of the coupling members and the end of the other member in the assembled joint, and slots in the lower portion of the sleeve and another inturned flange carried by the slotted portion of the sleeve adaptable to fit into the coupling member groove.

9. A tool joint comprising cooperating coupling members, a wear sleeve partially encasing at least one of said coupling members and having an external circumference greater than that of said coupling members, said coupling members having axially spaced abutments, said sleeve having an inturned flange engageable with said abutments for securing the sleeve to the coupling members, circumferential grooves formed at both junctions of the flange with the sleeve, and resilient material secured in the grooves and having portions extending from each groove and adapted to sealingly engage the coupling members upon assembly of the joint.

ELVIN G. BOICE.

REFERENCES CITED

The following references are of record in the file of this patent:

UNITED STATES PATENTS

| Number | Name | Date |
| --- | --- | --- |
| 1,117,835 | Greve | Nov. 17, 1914 |
| 1,518,960 | Bowser | Dec. 9, 1924 |
| 1,540,906 | Schweinert | June 9, 1925 |
| 1,626,729 | Handlon | May 3, 1927 |
| 1,764,769 | Woods | June 17, 1930 |
| 1,889,871 | Montgomery | Dec. 6, 1932 |
| 1,917,939 | Heeter | July 11, 1933 |
| 1,961,762 | Hinderliter | June 5, 1934 |